3,605,604
COFFEE MAKER WITH HEATER AND FILTER
Max Diebold, Eberhard Menge, Rudolf Hanschitz, and Helmut Humm, Reichenbach (Fils), Germany, assignors to Electrostar G.m.b.H., Reichenbach (Fils), Germany
Filed Apr. 10, 1970, Ser. No. 27,284
Claims priority, application Germany, Apr. 25, 1969, P 19 21 052.7
Int. Cl. A47j 31/057
U.S. Cl. 99—281
20 Claims

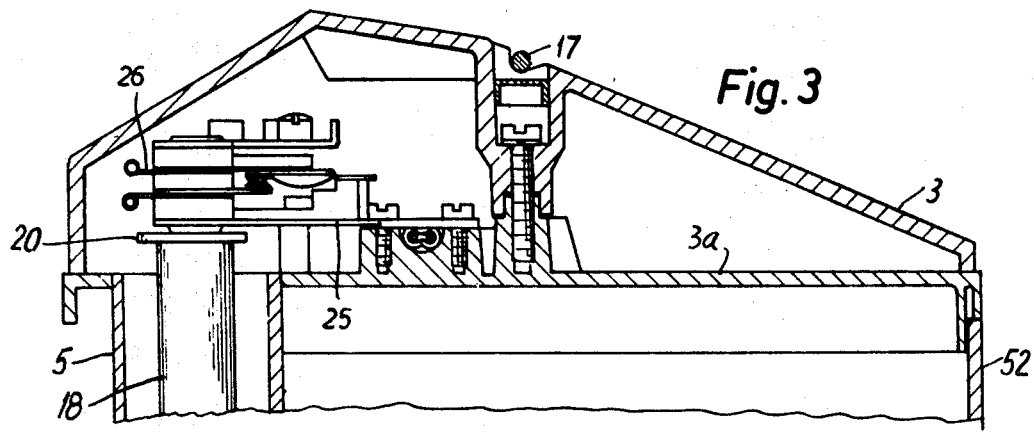
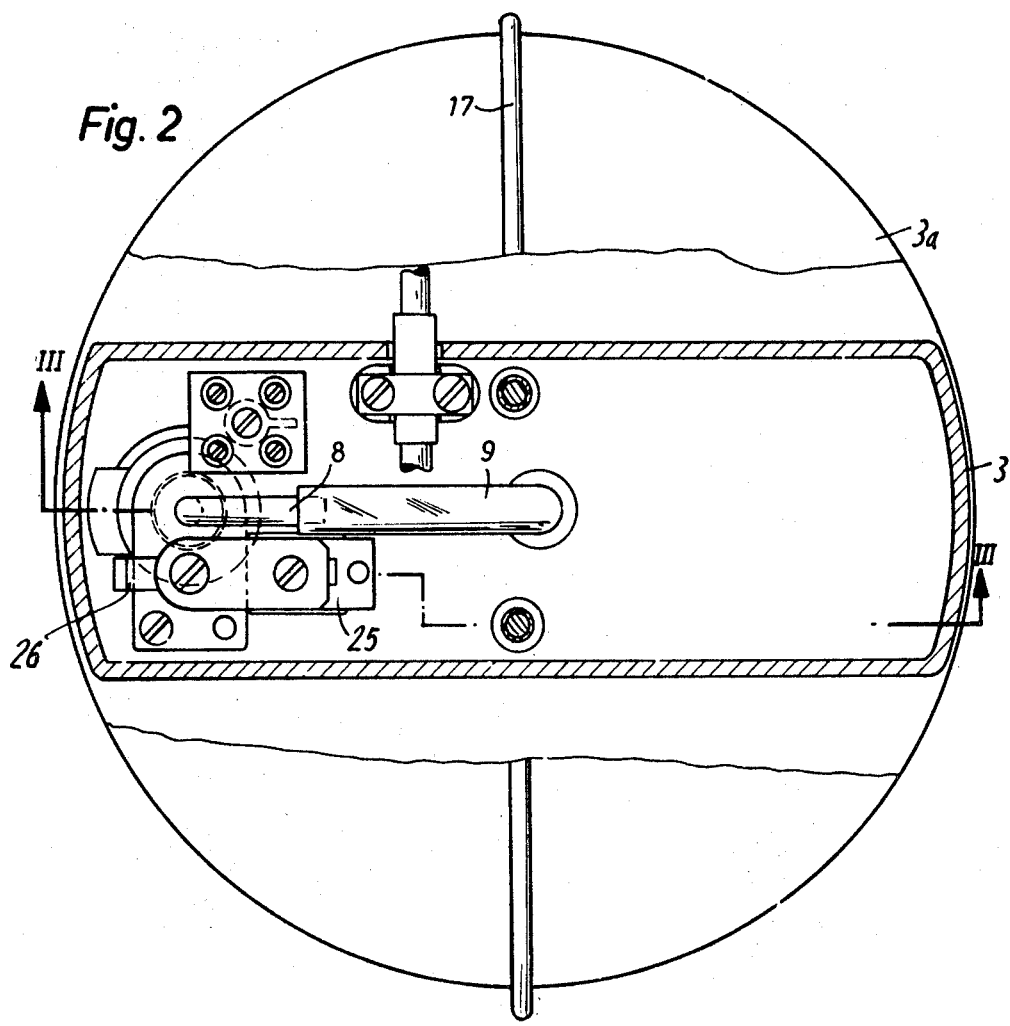

ABSTRACT OF THE DISCLOSURE

A coffee maker includes a centrally arranged filter support for receiving a filter element and a charge of coffee, with a container defining an annular space therearound for water which is closed by a cover which extends over the annular space and the top of the filter. A water heating tube is arranged within the annular space which includes a heater for heating the water which is delivered from the lower end of the tube through a relief valve connecting into the annular water space. The top of the tube extends from the annular space around the filter to an overhead discharge onto a screen arranged above the filter. The heated water which is discharged from the tube is distributed by the screen over the coffee and permitted to filter downwardly into a receptacle which is located below the device. The water heating tube includes an electric coil heater therearound and it is arranged in a sleeve and separated from the annular water space by an annular packing which surrounds the heating tube. Entrance to the sleeve and the heating tube is through a relief valve which closes when the pressure of the water within the heating tube reaches a predetermined amount, but which opens again once the charge of heated liquid is discharged upwardly and over and into the charge of coffee arranged above the filter.

SUMMARY OF THE INVENTION

This invention relates in general to a coffee making apparatus, and in particular to a new and useful coffee brewing device which includes a filter arranged centrally in respect to an annular water container and which includes a tubular electric heater arranged within a portion of the annular water container and connected through a relief valve to the water container for periodically heating the water and for discharging it onto the top of the filter.

The present invention is particularly concerned with an electric heater of a type which is adapted to be secured to an ordinary water heating pan or pot and which includes a tubular heater arranged in an annular water space which includes a rising and a descending tube portion. In the known devices of this type the electric heating system is arranged inside or outside, particularly underneath the water container. In order to ensure the passage of hot water into the filter the entire water of the container must be heated first to the corresponding temperature. In addition, a suitable heat-resistant material must be selected for the container. In order to eliminate these disadvantages, a known coffee percolator uses a continuous flow heater. In this way, only the water contained in the heater is heated without requiring that the entire water in the container be first heated before any coffee brewing takes place. First the water is conveyed only by the density difference between the cold and the hot water so that the delivery head is limited. Secondly, the water passes only in relatively small quantities, but uniformly into the filter. The ground coffee thus settles and thickens so that the passage of the water is made difficult. Consequently, relatively coarse ground coffee must be used, and the efficiency of the device, as well as the taste of the coffee, do not meet the necessary requirements.

In order to utilize the advantages of the continuous flow heat in such devices while avoiding their disadvantages, the rising table protrudes, according to the invention of the present case, at least partly into the water heating tube which is connected at one end with the water container through a relief valve and is closed at the other end. The tube is surrounded by an electric coil heater. In the cold state, water will flow at first up to the height of the water level into the rising tube and the water heating tube. As soon as a certain steam pressure is produced by the heat, the relief valve is closed downwardly and the water flows upwardly in the heating tube and over into the filter. Only when the steam pressure is lower than the pressure of the water which arrives, does the relief valve open to permit water to flow in for the next heating operation. This results in an intermittent water supply to the filter funnel. The resulting explosion-like filtration prevents caking of the coffee so that a considerably better extraction of the coffee flavor is achieved. The construction makes it possible to use particularly finely ground coffee so that the taste is also considerably improved. In addition, a smaller filter can be used since the device works with steam pressure. This means also that substantially greater heights can be overcome than in a model where the feed of the water is achieved merely by the density difference. By working at higher pressure, the boiling temperature is also increased so that the water passes over into the filter with higher temperatures.

Since the water container itself is not heated directly during the brewing operation and is only slightly heated by heat transfer, it is not necessary to make the water container of heat resistant material and even a simple plastic will be sufficient for this purpose. The use of a specific water heating tube offers the possibility of selecting the amount of water to be heated as desired by using a corresponding cross section of the water heating tube, and this would not be readily possible with an ordinary rising tube. Preferably the rising tube of the invention opens approximately at the bottom end of the water heating tube into the latter. The invention is naturally not limited to a coffee filter of the above described type, but can be used with advantage in coffee percolators of any type.

The rising tube preferably has an outlet above the water level for air which opens into the water heating tube. This air outlet port serves for the escape of air when new water enters into the rising tube from the water container. In addition, this port prevents the advance of unboiled water during the heating.

A heat bridge, particularly of a metal material is arranged around the upper part of the water heating tube between the tube and the surrounding rising tube arranged in the annular water space. In this way, the water which is already contained in the rising tube is reheated. In order to increase this reheating, the heat bridge is at least partly in contact with the electric heater formed by the electrical coil.

In accordance with a feature of the invention, a relief valve is arranged below the heating tube and is in the form of a disc which is seated on an annular valve seat defined in the sleeve which surrounds the heating tube and is arranged in the annular water space. The relief valve may be of an elastic plastic material. If an overpressure is produced by some defect in the device, for example if the heater is not shut off when the water container is empty, the elastic relief valve is forced by this overpressure out of its seat so that the overpressure can escape.

A particularly favorable embodiment is obtained when the rising tube is secured particularly with the water heating tube and the electric heater is arranged on a cover closing the water container. Preferably, the rising tube with the water heating tube and the electric heater is arranged in a sleeve which protrudes into the water container and with a part of the sleeve which surrounds the electric water heater being sealed off from the water container, for example adjacent the lower end thereof. This prevents water access to the heater so that a double insulation is obtained, and on the other hand, the heat passes directly over into the water container. In order to further increase the last mentioned advantage, the space enclosing the electric heater is heat-insulated at least toward the water container. In order to simplify the fastening of the individual parts, the sleeve can be connected directly with the cover. A further simplification results if the relief valve of the sleeve is arranged at the free or lower end thereof.

In order to prevent an overheating of the device, particularly when the water container is empty, a temperature feeler is arranged on the rising tube, the descending tube or water heating tube, and this controls a switch which interrupts the current supply to the electric heater at over-temperature. In order to insure a tight bearing of the filter on the cover and a firm connection between the cover and the water container, a pivoted clamp stirrup for the cover is arranged so that it is journalled in the water container and may be moved over the cover to engage in a groove thereof to hold it tightly in place on the annular water container. This stirrup can also be designed as a carrying handle for the water container.

In the preferred arrangement the filter funnel is centrally arranged within an annular water container, and in order to prevent cooling of the filter area by the surrounding still unheated water, there is a heat-insulating space therebetween. The filter funnel or the water container are designed for attachment onto the top of an ordinary coffee pot. In order to obtain room for filling the water into the water container and for the electric heater, the filter funnel is preferably oval in shape at its filling end or at least flattened on one side. Above the filter is preferably provided a screen plate which effects a favorable distribution of the hot water over the ground coffee in the filter and which prevents the coffee from foaming or prevents the coffee grinds from rising into the cover. This saves unnecessary cleaning of these parts. It was found particularly expedient to limit the apertures of the screen plate to the range opposite the mouth of the descending tube.

The filter funnel is sealed at its filling end by a packing from the water container. The filter is thus closed with the exception of the hot water inlet, so that a steam pressure can be formed which enforces a rapid filtration and thus prevents overflowing of the filter. In order to facilitate the determination of the necessary amount of water, the water container is made of a transparent material which permits ready observation. Furthermore it is advisable that at least a part of the rising or descending tube which is visible from the outside is made of a transparent material so that the variation of the water flow can be observed.

Accordingly, it is an object of the invention to provide an improved coffee brewing device which includes a filter element and a container for water which communicates with a heating tube, the heating tube being heated such as by an electric heater which will cause the upward movement of the water or the vapor in the tube for delivery over onto the top of the filter for filtering through coffee positioned thereon.

A further object of the invention is to provide a coffee brewing machine which advantageously includes a water container which is of annular form and which surrounds a filter space which is formed therewith and which is capable of accommodating a filter element and coffee below a screen plate arranged at the top thereof, the annular space holding a tubular heater having a rising tube portion and a descending tube portion connected thereto having a discharge over the top of the filter screen, and the tube advantageously including a heating coil therearound and a heat bridge of metal arranged adjacent the upper end, and also including a vent port at the top thereof for permitting the inflow of water thereto, the tube being surrounded by a sleeve having an opening at the bottom which is closed by a relief valve and which communicates with a water space defined within the container.

A further object of the invention is to provide a coffee brewing device which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described the preferred embodiment of the invention.

BRIEF DESCRIPTION OF THE DRAWINGS

In the drawings:

FIG. 2 is a partial top plan view partly broken away of the device indicated in FIG. 1; and FIG. 3 is a section taken along the line III—III of FIG. 2.

GENERAL DESCRIPTION OF THE PREFERRED EMBODIMENT

Figure 1:
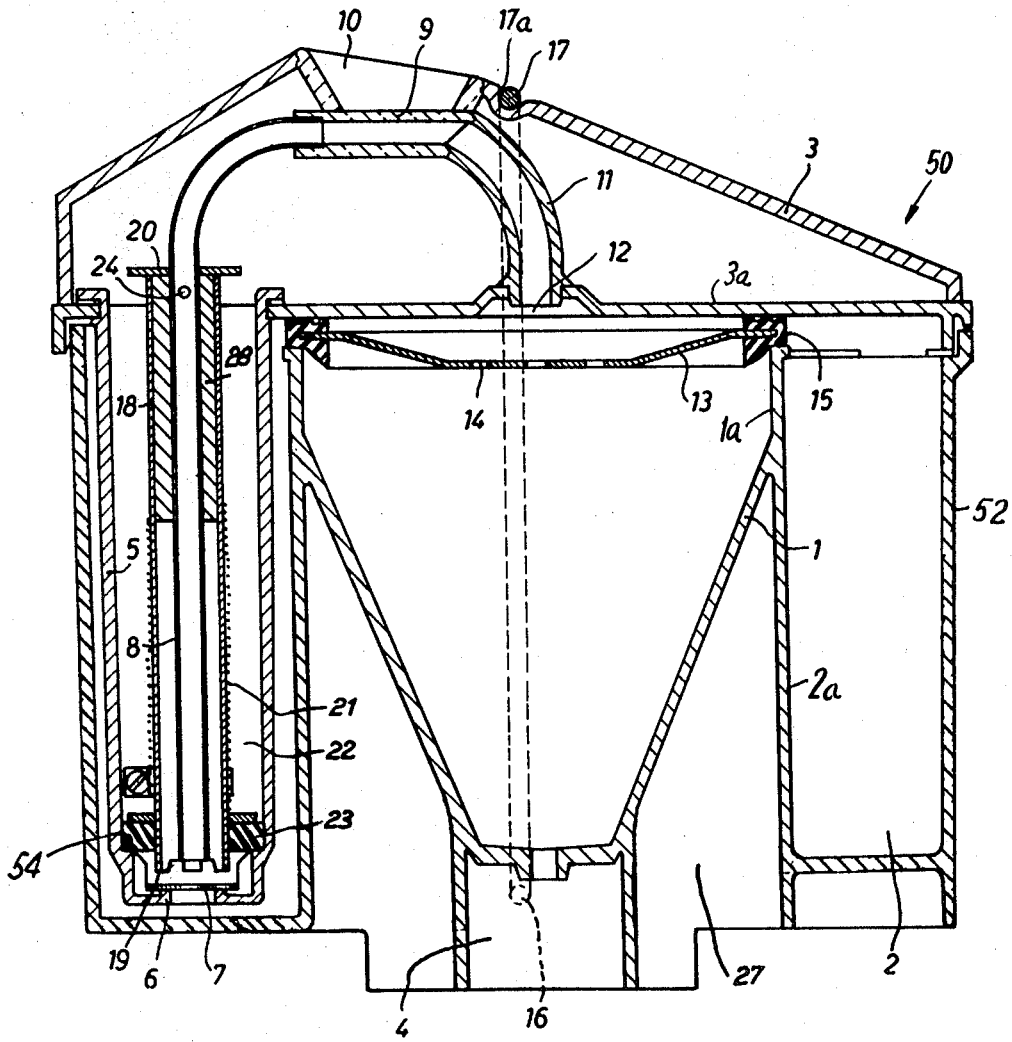
FIG. 1 gives a transverse sectional view of a coffee brewing device constructed in accordance with the invention.

Referring to the drawings in particular, the invention embodied therein comprises a coffee brewing device, generally designated 50, which comprises a container 52 having a central filter funnel or coffee container 1 into which a filter (not represented) is insertable and ground coffee may be poured. The filter funnel 1 is provided with a vertical wall portion 1a which forms an upper extension of an inner wall 2a of an annular water compartment 2. The top of the container is closed by a cover 3 which includes an inner cover plate portion 3a which closes the top of the filter 1 and the annular water compartment 2.

In accordance with a feature of the invention, the container 2 is designed so that it may be attached over and onto a conventional coffee pot. An annular space 27 is defined between the filter 1 and the water space of the container 2, and this serves as a heat insulation so that unheated water contained in the water container 2 does not necessarily cool the water which is being directed through the funnel 1.

In acordance with a further feature of the invention, a tubular holder or sleeve member 5 is carried by the interior wall 3a of the cover 3 and extends downwardly into the water space 2. It includes a lower or bottom end 6 having an annular valve seat which is closed by a relief valve 7. The sleeve is provided with a ledge 54 which mounts an annular packing 23 for a water heating tube 18 which is inserted through the packing and terminates in a lower end 19 which is based above the relief valve 7. The water heating tube 18 carries a centering boss in the form of a metal heat bridge 28 which is located adjacent the top of the water heating tube 18. A heating tube or rising tube 8 is located centrally within the outer heating tube 18 and within the heat bridge 28 and it terminates in a lower opening adjacent the opening 19 of the outer water heating tube 18. The upper end of the heating tube 8 is curved toward the filter 1 and it includes an intermediate level portion 9 which is connected at its opposite end to a descending tube portion 11 which terminates in a mouth or discharge 12 located over the filter 1. The cover 3 includes an opening or a transparent portion 10 over the transparent portion 9 which may be observed from viewing the top of the device.

A screen plate 13 is carried in an annular packing member 15 which is interposed between the inner cover portion 3a and an upper wall portion 1a of the filter 1. The screen plate 13 is provided with apertures 14 which are located only in the range of the mouth 12. The packing 15 seals off the water container 2 with the cover portion 3a and the filter 1. The cover is secured in respect to the container 52 by a clamping stirrup 17 having ends which are journalled in side portions at 16 of the container 52 and which engage in a recess or groove 18 at the top of the cover 3.

The heating tube 18 is closed at its top end by a plate 20 and it carries an electric coil heater 21 on the lower portion of its exterior. The heat bridge 28, which is made of a metal, is in contact with some portion of the heater coil 21 and this ensures the reheating of the water which is already contained in the rising tube 8. The relief valve 7 which is arranged at the bottom end 6 of the sleeve 5 closes off the bottom end of the water heating tube 18 and it advantageously comprises an elastic material which is forced out of its seat at a corresponding overpressure. The packing 23 seals the space 22 above the packing and within the sleeve 5 from the water container 2. Above the possible water level of the container 2 which is not represented, there is provided an air outlet port 24 for the rising tube 8 which opens into the water heating tube 18.

As indicated in FIGS. 2 and 3, a temperature feeler 25 is secured on the water heating tube 18 and it controls a switch 26 in accordance with the temperature which is sensed. At any over-temperature, particularly when the water container 2 is empty, the current supply to the heater 21 will be interrupted by the switch 26.

When it is desired to fill water into the water container 2, the cover 3 is removed, after the clamping stirrup 7 has been loosened. Then the water is poured laterally of the filter 1 into the water container 2. After a filter has been inserted into the filter holder 1 and coffee has been poured in over the filter, the cover is again closed and locked by means of the clamping stirrup 17. The filter is then ready to be used.

Water can flow from the container 2 into the water heating tube 18 and a rising tube 8 through the relief valve 7 up to the height of the water level which is not represented. The air contained in the rising tube can escape through port 24. This port 24 also prevents the advance of unboiled water. If the heater 21 is then turned on, the water contained in the water heating tube 18 and the rising tube 8 will be heated.

The relief valve 7 is closed by the steam pressure and and water can flow into the filter funnel 1 from the rising tube 8, the intermediate tube 9 and the descending tube 11. Thereafter the cooperation of the water heating tube 18 with the relief valve 7 is such that there is an intermittent admission of the liquid from the rising tube 8 to the filter 1. As soon as the steam pressure is lower than the pressure of the water arriving from the container 2, the relief valve 7 opens again and the cycle starts all over.

What is claimed is:

1. A coffee brewing device, comprising means defining a container for coffee having a top opening for receiving boiled water for flow over the coffee and a bottom opening for the discharge of the coffee, a liquid container adjacent said coffee container, a heating tube in said liquid container having a liquid opening adjacent the lower end thereof connected with said liquid container, relief valve means associated with said liquid opening for regulating the flow of liquid from said container into said heating tube, a liquid rising tube extending upwardly through said heating tube and having a lower end protruding into the liquid of said heating tube and extending at its upper end over said container for coffee and terminating in a discharge over said container for coffee, and heater means associated with said heating tube for heating the liquid therein and in said rising tube to boil the liquid and cause a periodic movement thereof through said discharge onto the coffee of said coffee container.

2. A coffee brewing device according to claim 1, wherein said rising tube includes a lower end which is connected with said water container through said relief valve means, said electric heater comprising a coil heater connected with said rising tube.

3. A coffee brewing device, according to claim 1, wherein said rising tube has an opening at its bottom end which is located adjacent the bottom end of said heating tube.

4. A coffee brewing device, according to claim 1, including a metal heat bridge arranged in the upper part of said heating tube between said tube and said rising tube.

5. A coffee brewing device, according to claim 1, including a sleeve surrounding said heating tube and having an inlet opening at the bottom thereof, said relief valve means including a valve disc seated over the inlet opening of said sleeve and being made of an elastic material.

6. A coffee brewing device, according to claim 1, wherein said rising tube includes an air outlet port at a location above the liquid level of said water container opening into said heating tube.

7. A coffee brewing device according to claim 1, including a cover covering said liquid container and said coffee container, said cover carrying said rising tube, said heating tube, and said heater means.

8. A coffee brewing device according to claim 1 including a sleeve arranged within said liquid container surrounding said heating tube, said sleeve having a lower opening surrounded by a valve seat, said valve means including a disc valve disposed between said valve seat and the lower end of said heating tube, and packing means sealing said heating tube with at least the lower end of said sleeve from an upper portion thereof, said heater means being contained in the upper portion thereof.

9. A coffee brewing device, according to claim 8, wherein said packing means hold said heating tube at a spaced relationship from said sleeve and defines an insulation space around said heater, said sleeve being secured to said cover.

10. A coffee brewing device, according to claim 1 including temperature sensing means adjacent said rising tube, said heater means including a control switch connected to said temperature sensing means and being operable thereby to start and stop said heater.

11. A coffee brewing device, according to claim 1, wherein said water container comprises an annular member defining an annular water space surrounding said container for coffee, said container for coffee including an inclined wall for receiving a filter above which the coffee is adapted to be positioned and terminating centrally at the lower end of said inclined wall in a discharge, a cover surrounding the top of said annular container covering said container for coffee, and a pivotal clamping stirrup secured to said container and engaged over said cover.

12. A coffee brewing device, according to claim 11, wherein said annular container surrounds said coffee container, said cover including an inner wall portion carrying said rising tube and said heating tube.

13. A coffee brewing device, according to claim 12, wherein said coffee container comprises a filter having sloping walls which are spaced from said annular liquid container and define an insulation space there-between.

14. A coffee brewing device, according to claim 1, wherein said liquid container is of annular construtcion, and surrounds said coffee container and includes means adjacent the lower end thereof for supporting said container on a coffee pot.

15. A coffee brewing device, according to claim 14, wherein said container for coffee includes a top opening of oval configuration.

16. A coffee brewing device, according to claim 1, including a filter screen arranged over said container for said coffee having openings therein for distributing liquid over the top of the coffee contained in said container for coffee.

17. A coffee brewing device, according to claim 16, including sealing means for sealing the top of said container for said coffee from said liquid container.

18. A coffee brewing device, according to claim 1, wherein said liquid container is made of a transparent material.

19. A coffee brewing device, according to claim 1, wherein at least a portion of said rising tube is made of a transparent material which is visible from the outside of said device.

20. A coffee brewing device, according to claim 1, wherein said rising tube includes an intermediate portion extending substantially horizontally, and a cover closing said liquid container and said container for coffee and having an opening aligned with said intermediate portion of said rising tube, said rising tube intermediate portion being transparent to permit visual observation of the liquid passing therethrough.

References Cited

UNITED STATES PATENTS

| | | | |
|---|---|---|---|
| 1,922,782 | 8/1933 | Schallis | 99—307 |
| 2,065,211 | 12/1936 | Carvalho | 99—307 |
| 2,846,938 | 8/1958 | Brandl | 99—307X |
| 3,358,583 | 12/1967 | Lepoix | 99—307 |

ROBERT W. JENKINS, Primary Examiner

U.S. Cl. X.R.

99—315